United States Patent

[11] 3,625,347

[72] Inventor Earl M. Trammell, Jr.
 39 Salem Estates Drive, Ladue, Mo. 63124
[21] Appl. No. 881,415
[22] Filed Dec. 2, 1969
[45] Patented Dec. 7, 1971

[54] LITTER AND STORAGE CONTAINER IN AN AUTOMOBILE SEAT ASSEMBLY
 7 Claims, 18 Drawing Figs.
[52] U.S. Cl. .................................................. 206/19.5 R,
 224/42.42 A
[51] Int. Cl. ...................................................... B60n 3/08
[50] Field of Search ............................................ 206/19.5 R;
 224/29 D, 42.42 A

[56] References Cited
 UNITED STATES PATENTS
 3,497,119 2/1970 Beeck ........................... 224/29 D
 3,252,637 5/1966 Hart .............................. 224/1
 3,082,863 3/1963 Oharenko ..................... 206/19.5 R
 3,002,665 10/1961 Allen ............................ 224/42.42

Primary Examiner—Leonard Summer
Attorney—Cohn & Powell

ABSTRACT: A litter and storage container in an automobile seat assembly, having a rear portion that fits under the seat communicating with a front portion that engages the front seat side adjacent the lower edge of the automobile seat, said front and rear portions together having a generally L-shaped configuration. A mounting means connects the casing to the seat, the mounting means including an adjustable clamp means connected to the container and engaging a rearwardly facing seat shoulder to hold the container tightly against the front seat side. In one embodiment, the clamp means includes a threaded fastener that extends through socket, connected to the container by magnets, and a hook threadedly attached to the fastener that engages the seat shoulder to clamp the seat between the hook and casing flange. In another embodiment, the clamp means includes a flat coil spring having one end attached to the container and the opposite end attached to the seat shoulder, the spring loading clamping the seat between a spring end and the container front portion. The container includes telescopically related upper and lower sections, the container sections being adjusted for different underseat heights.

Inventor
EARL M. TRAMMELL, JR.

By Cohn and Powell
Attorneys

Inventor
EARL M. TRAMMELL, JR.
By Cohn and Powell
Attorneys

Inventor
EARL M. TRAMMELL, JR.

By Cohn and Powell
Attorneys

Inventor
EARL M. TRAMMELL, JR.

By Cohn and Powell
Attorneys

Inventor
EARL M. TRAMMELL, JR.
By Cohn and Powell
Attorneys

LITTER AND STORAGE CONTAINER IN AN AUTOMOBILE SEAT ASSEMBLY

CROSS REFERENCE TO RELATED APPLICATIONS:

This application discloses improvements of devices of copending application, Ser. No. 724,509, filed Apr. 26, 1968, now U.S. Pat. No. 3,547,326; application Ser. No. 744,482, filed July 12, 1968 now U.S. Pat. No. 3,526,314; and application Ser. No. 791,940, filed Jan. 17, 1969, now U.S. Pat. No. 3,504,830

BACKGROUND OF THE INVENTION

This invention relates generally to improvements in a litter and storage unit in an automobile seat assembly, and more particularly to an improved means for mounting such container to a forwardly, rearwardly, upwardly or downwardly adjustable front seat. The container can hold litter, driving accessories, a Kleenex dispenser, stereo tapes, first aid kit, salesman's daily records or any convenience items.

The heretofore conventional litter containers have either incorporated a gravity fit such as the common placement of a container across the transmission hump on the front seat floor, or have employed attaching means for the litter container to the dashboard, kick pad, and so forth, of the automobile. These latter means of attachment necessitated different fixtures for each make of automobile. Also, both the gravity and fixed positions mentioned served to interfere at times with the movement of the driver and passenger. Litter containers have also been made in one piece with integral hooks under the front seat of an automobile to maintain a fixed position against the lower portion of the front seat. This is a desirable location since it is both accessible and out of the way of the occupants. However, there has been no general acceptance to date of this hook design since it is limited in practical attachment to the varying seat structures.

Those devices which could be hung from internal projections were usually constructed inexpensively of paper so that they could be thrown away when filled, and consequently were not readily available when a supply was depleted. Moreover, such containers are not convenient because they obstruct the use of the mounting projection and were usually located in an area where they interfered with the driver's or passenger's movements and actions. Those containers which rested on the seat took up seating room and diminished the occupant's comfort.

The containers which rested on the floor hindered the movement of the occupant's legs and were not always in the optimum position for usage, especially when utilized in conjunction with a movably mounted automobile front seat.

There are no general containers of this type that can be installed with a seat assembly as an accessory at minimal expense and yet achieve the desired functional advantages.

SUMMARY OF THE INVENTION

The present litter and storage container is attached to an automobile seat at the front side by a special mounting means. The container is located under the front seat and is located under the occupant's legs near the floor so that the container does not hamper the movement of the occupant. The container is in a relatively concealed position, yet is readily available for usage. The container does not occupy important and otherwise usable seat or floor space.

The invention positions the litter and storage container in this convenient position by new attachment means which permits practical and easy installation on a front seat structure of any automobile, including those with power seats. It provides a pressure fit against the front seat regardless of the structure variance that exists from one make of automobile to another.

The litter disposal unit, including the unique mounting means, is simple and durable in construction, and inexpensive to manufacture and assemble. It can be quickly and easily installed in any automobile by anyone without the need for any complicated instructions or special tools. Accordingly, the container is one that can be sold as an accessory and can be readily installed by the average automobile owner or user.

Because the container is retained to the seat side by the mounting means, the container will be carried by the seat during selective adjustment of the seat position, and will therefore be maintained in the appropriate location at all times.

The litter and storage container includes a front opening casing that fits under the seat adjacent the bottom seat side and with its opening adjacent the front seat side, and includes a top-open drawer slidably interfitting the casing into which items can be placed. The mounting means includes an adjustable clamp means connected to the casing and engaging a rearwardly facing seat shoulder to hold an upwardly extending casing flange tightly against the front seat side.

In one embodiment, the clamp means includes a threaded fastener extending through a socket carried by the casing, and a hook threadedly attached to the fastener and engaging the seat shoulder to clamp the seat between the hook and the casing flange. In another embodiment, the clamp means includes a flat coil spring having one end attached to the casing and the opposite end attached to the seat shoulder, the loading of the spring clamping the seat between a spring end and the casing flange.

When a flat coil spring is utilized, it can have its free outer end attached to the casing and have its coiled end engaging the seat shoulder so that the spring loading clamps the seat between the coil spring end and the casing flange. The structure can be conveniently reversed so that the free outer end of the coil spring engages the seat shoulder while the coiled end is connected to the casing, whereby the spring loading clamps the seat between the outer spring end and the casing flange.

In order to adjust for different underseat heights, both the casing and the drawer are constructed of telescopically related upper and lower parts, the casing part being adjusted for different underseat heights, and the drawer parts being adjusted to interfit the telescopically adjusted casing parts. Lock means are provided between overlapping walls of both the casing parts and the drawer parts to hold the associated parts in adjusted relation. Specifically, the lock means between the casing and drawer parts include a plurality of interfitting, longitudinal ribs and grooves on adjacent side walls which permit the associated parts to be slidably interfitted endwise and subsequently held in any adjusted telescopic relation.

In another embodiment, the litter and storage container is of substantially L-shape having a portion extending under the seat and another portion extending forwardly of and adjacent to the front seat side, the front container portion having a top opening through which items can be placed in the container. The adjustable clamp means connecting the container to the seat shoulder holds the front container portion tightly against the front seat side. This container can also be constructed of telescopically related upper and lower parts which are held in adjusted position to fit under the seat by lock means between overlapping walls of the container parts.

DESCRIPTION OF THE PREFERRED EMBODIMENTS

Figure 2:
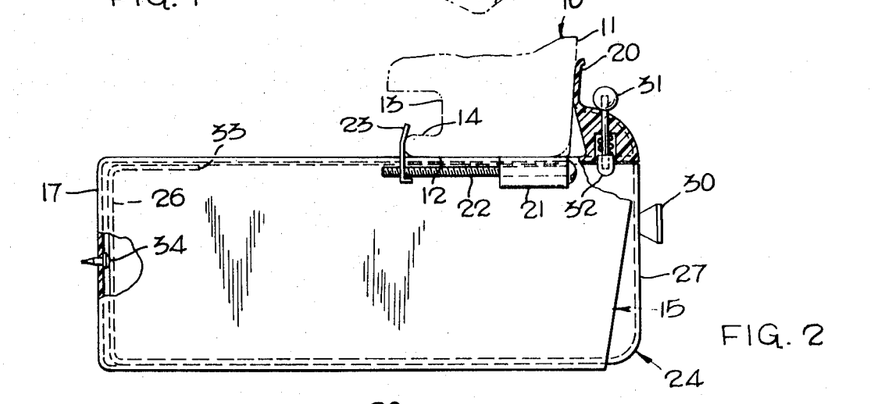
FIG. 2 is a side elevational view of the container illustrated in FIG. 1 with various portions being broken away and shown in cross section for sake of clarity.

Referring now by characters of reference to the drawings, and first to FIG. 2, it will be understood that the seat assembly includes an automobile front seat 10 having a front side 11, a bottom side 12 adjacent to the front side 11 and a rearwardly facing seat shoulder 13 that includes a ledge 14. Although not shown, it will be understood that the automobile front seat 10 can be selectively adjusted forwardly, rearwardly, upwardly or downwardly by suitable conventional mechanism.

Figure 1:
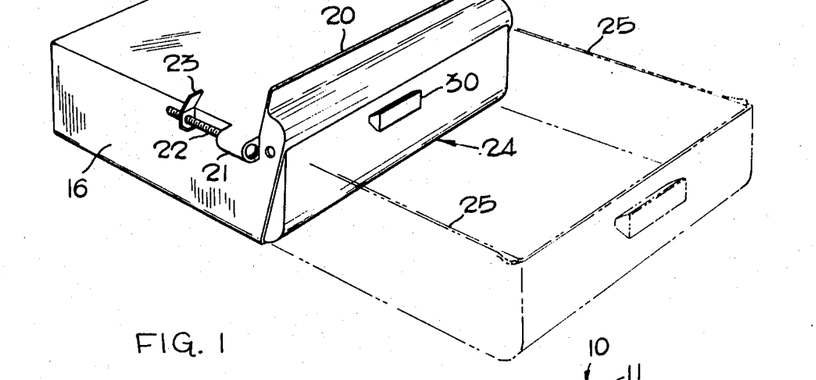
FIG. 1 is a perspective view of a litter and storage container, the drawer being shown in extended position by the broken lines.
Figure 3:
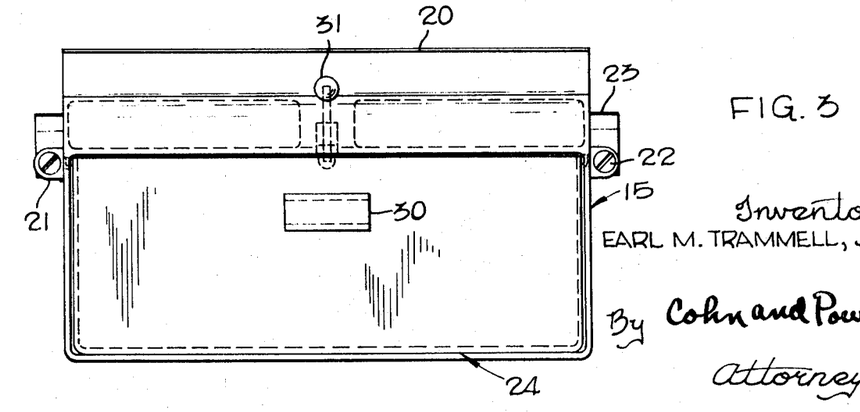
FIG. 3 is a front elevational view of the container of FIGS. 1–2.

The embodiment of the litter and storage container disclosed in FIGS. 1-3 includes a casing 15 having opposite sidewalls 16 and a rear wall 17. The casing 15 has a transverse front opening. Formed integrally with the casing 15 is an upwardly extending flange 20 that is adapted to engage the front seat side 11.

The mounting means utilized to attach the casing 15 to the seat 10 includes a laterally extending boss 21 at each side of casing 15, each boss 21 including a socket through which a threaded fastener 22 extends. A hook 23 is threadedly connected to each fastener 22.

To mount the casing 15 to the seat 10, the casing 15 is fitted underneath the seat 10 with the flange 20 held against the front seat side 11. Then, the fasteners 22 are threadedly tightened to clamp the hooks 23 tightly against the seat shoulder 13. The seat 10 is clamped securely between the hooks 23 and the casing flange 20.

A compatible drawer 24 is adapted to interfit the casing 15. This drawer 24 includes opposed sidewalls 25, rear wall 26 and front wall 27. A handle 30 is provided on the drawer front wall 27 to facilitate closing and opening of the drawer 24.

Retained by and mounted on the casing flange 20 is a plunger 31 that is spring loaded in a downwardly direction. The enlarged plunger head 32 is adapted to engage the inturned wall stop 33 when the drawer 24 is pulled out in order to maintain operative connection between the casing 15 and drawer 24. The plunger 31 can be digitally and selectively lifted so that the plunger head 32 will clear the stop 33 if it is desired to remove the drawer 24 completely for the purpose of cleaning or emptying.

Carried by the rear casing wall 17 is a resilient buffer 34 which is adapted to engage the rear drawer wall 26 to prevent rattling between the drawer 24 and casing 15.

Figure 4:
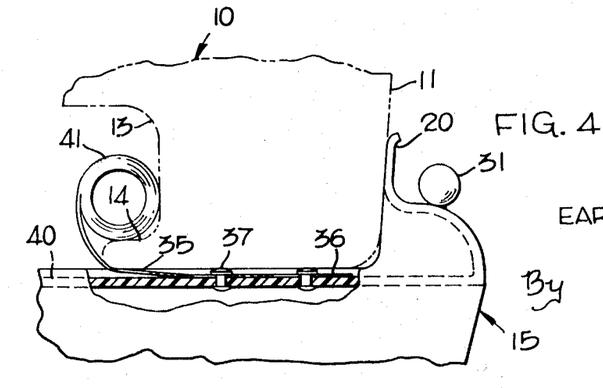
FIG. 4 is a fragmentary, side elevational view, partly in cross section, illustrating a modification of the mounting means for the container of FIGS. 1–3.
Figures 5, 6, 7:
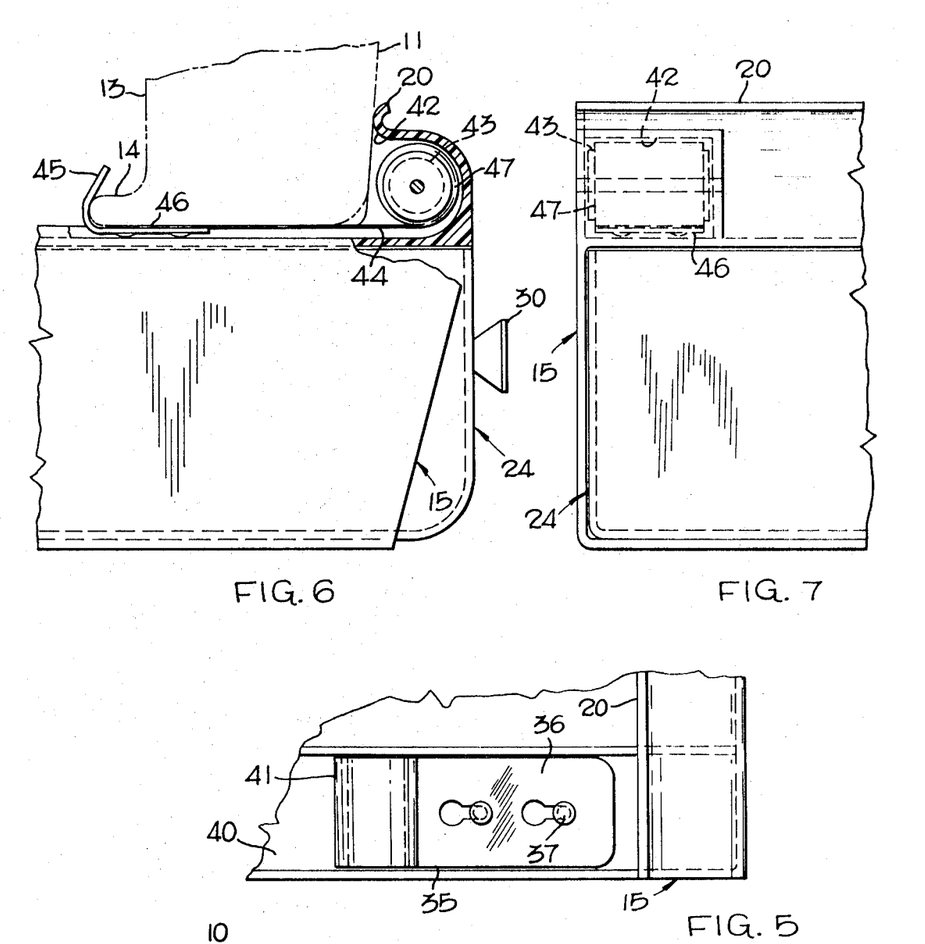
FIG. 5 is a fragmentary, top plan view of the mounting means shown in FIG. 4.
FIG. 6 is a fragmentary, side elevational view, partly in cross section, showing another modification of the mounting means to be utilized with the container of FIGS. 1–3.
FIG. 7 is a fragmentary, front elevational view of the container and mounting means of FIG. 6.

FIGS. 4 and 5 disclose another type of mounting means to secure the casing 15 to the seat 10. In this embodiment, the mounting means includes a flat coil spring 35 having its free outer end 36 secured by rivets 37 to the top wall 40 of casing 15. Preferably, one coil spring 35 is provided at each side of the casing 15. The opposite coiled end 41 of spring 35 hooks over the ledge 14 and engages the seat shoulder 13. The loading of spring 35 securely clamps the seat 10 between the coiled end 41 and the casing flange 20.

Still another type of mounting means is illustrated in FIGS. 6-7. In this embodiment, the container flange 20 is provided with a rearwardly opening flange chamber 42 at each side of the casing 15 in which a spool 43 is rotatively mounted. A flat coil spring 44 has a hook 45 secured to its outer free end 46, the hook 45 being adapted to fit over the ledge 14 and bear against the seat shoulder 13. The opposite coiled end 47 of spring 44 is mounted on the spool 43, and hence is located in the flange chamber 42. The loading of springs 44 clamp the seat securely between the hooks 45 and casing flange 20.

In the container embodiment of FIGS. 8-11, the casing 50 consists of telescopically related upper and lower casing parts 51 and 52. The casing part 51 includes opposed side walls 53 and a rear wall 54. The casing part 51 includes the container flange 20 of the type utilized in the prior embodiments. The casing part 52 includes opposed sidewalls 55 and rear wall 56. When the casing parts 51 and 52 are telescopically related, the sidewalls 53 of the upper casing part 51 overlaps the adjacent associated side walls 55 of the lower casing part 52.

The locking means utilized to secure the overlapping sidewalls 53 and 55 in adjusted telescopic relation consist of a plurality of interfitting ribs and grooves 57 extending lengthwise of the associated side walls. The upper casing part 51 is slidably fitted endwise over the lower casing part 52 with the ribs and grooves 57 of the associated overlapping sidewalls 53 and 55 engaging to provide the suitable height to fit under the automobile seat.

A side hook 60 is formed on the front edge of each side wall 55 of the lower casing part 52 so as to embrace the front edge of the sidewall 53 of the upper casing part 51, the side hooks 60 precluding spreading of the casing side walls 53 and unintentional disengagement of the interlocking ribs and grooves 57.

The mounting means shown on the casing 50 is the same as that disclosed on the embodiment of FIGS. 1-2. Each threaded fastener 22 extends through an associated casing boss 21 and is threadedly attached to a hook 23. This mounting means is attached to the seat in the same manner as the mounting means of the container embodiment previously described with respect to FIGS. 1 and 2. Of course, it will be understood that the mounting means utilizing a coil spring such as those previously disclosed in the embodiments of FIGS. 4-5 and FIGS. 6-7 can be conveniently utilized also.

Figure 9:
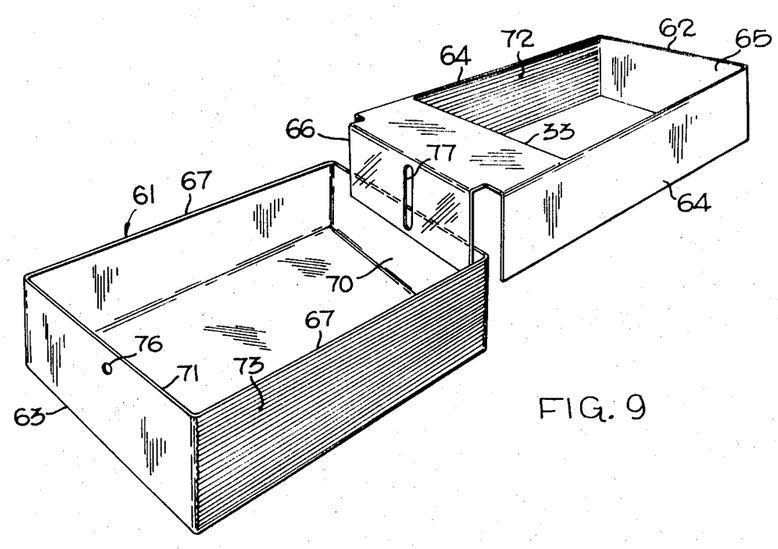
FIG. 9 is a perspective view of a drawer to be utilized with the casing of FIG. 8.
Figure 10:
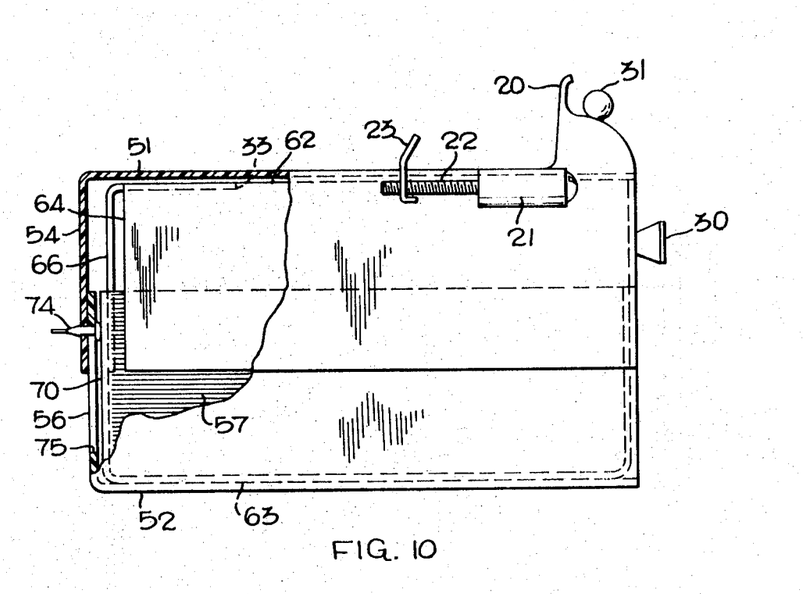
FIG. 10 is a side elevational view, partially shown in cross section, illustrating the assembly of the casing and drawer of FIGS. 8-9.
Figure 11:
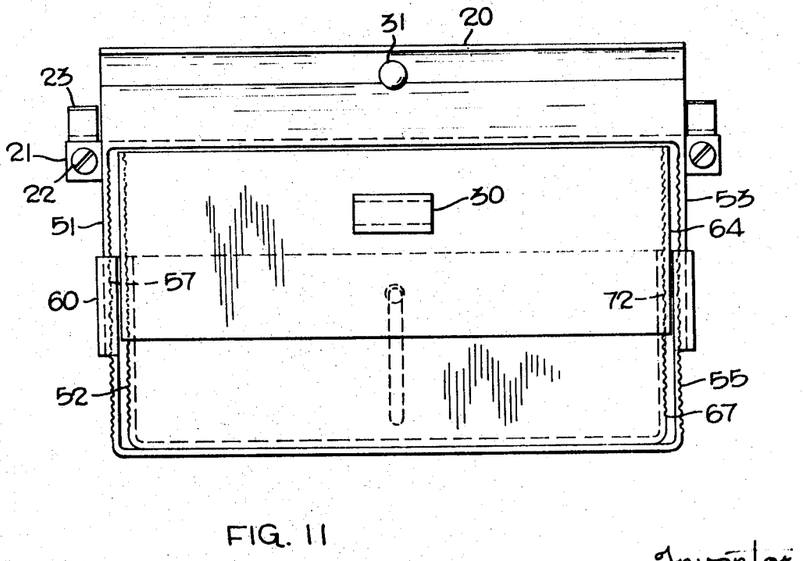
FIG. 11 is a front elevational view of the container shown in FIG. 10.
Figure 12:
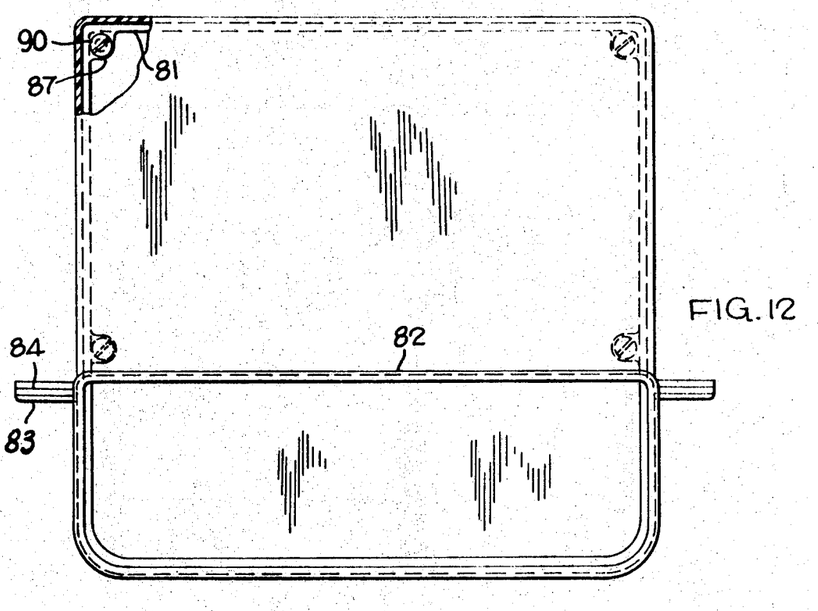
FIG. 12 is top plan view of another embodiment of the container, partially shown in cross section.
Figure 13:
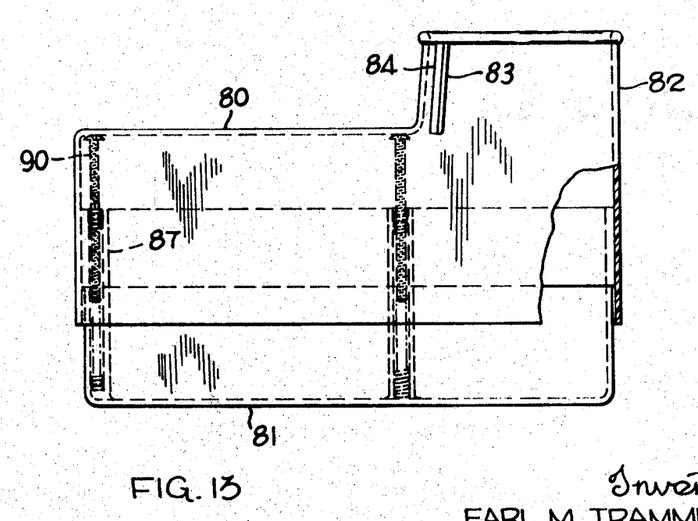
FIG. 13 is a side elevational view, partly in cross section, of the container shown in FIG. 12.
Figure 14:
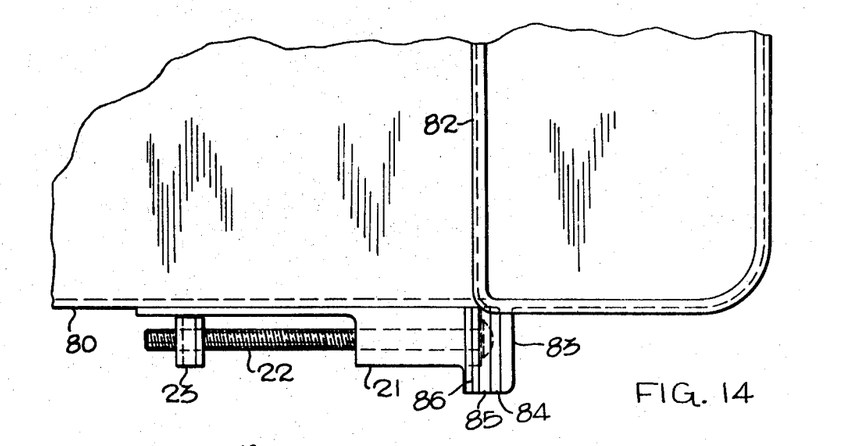
FIG. 14 is a fragmentary, top plan view of the container of FIGS. 12-13 with its mounting means.
Figure 15:
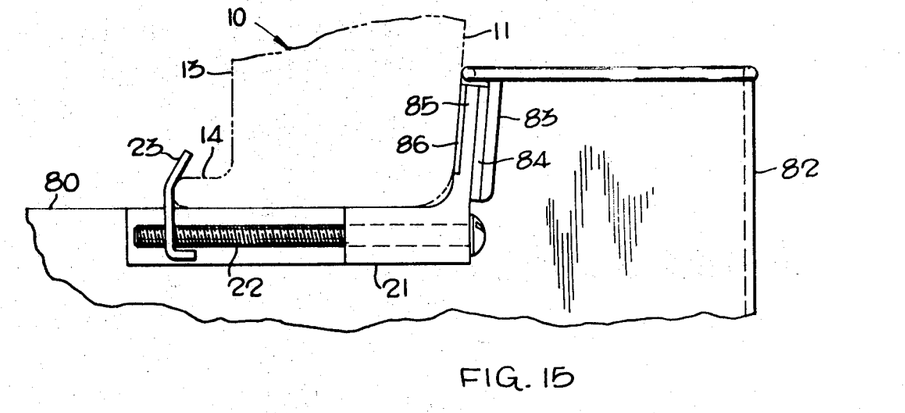
FIG. 15 is a fragmentary, side elevational view of the container of FIGS. 12-13 attached to an automobile seat.
Figure 16:
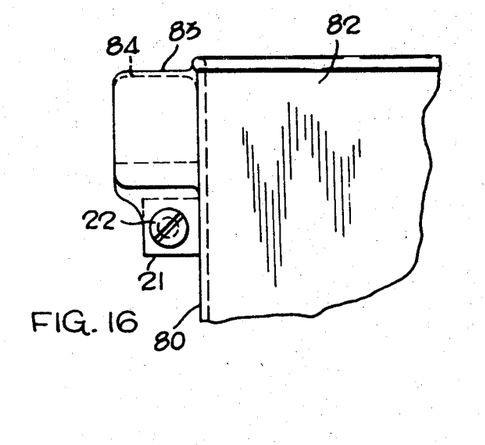
FIG. 16 is a fragmentary, front elevational view of one corner of the container of FIG. 14.

The drawer 61 that is used with the casing 50 is best shown in FIG. 9. The drawer 61 includes telescopically related upper and lower drawer parts 62 and 63. The upper drawer part 62 includes opposed sidewalls 64, a rear wall 66 and a front wall 65. The lower drawer part 63 includes opposed sidewalls 67, rear wall 70 and front wall 71. In assembly, the front drawer wall 65 of upper drawer part 62 fits into the lower drawer part 63 and is located adjacent the inner face of the front wall 71. The sidewalls 64 of the upper drawer part 62 overlap the sidewalls 67 of the lower drawer part 63.

Lock means interconnect the associated, adjacent side walls 64 and 67 to hold the drawer parts 62 and 63 in adjusted, telescopically related position. The lock means consists of a plurality of longitudinally extending ribs and grooves 72 formed on the sidewalls 64 of upper drawer part 62 and of compatible and coacting ribs and grooves 73 formed on the associated side walls 67 of the lower drawer part 63.

Figure 8:
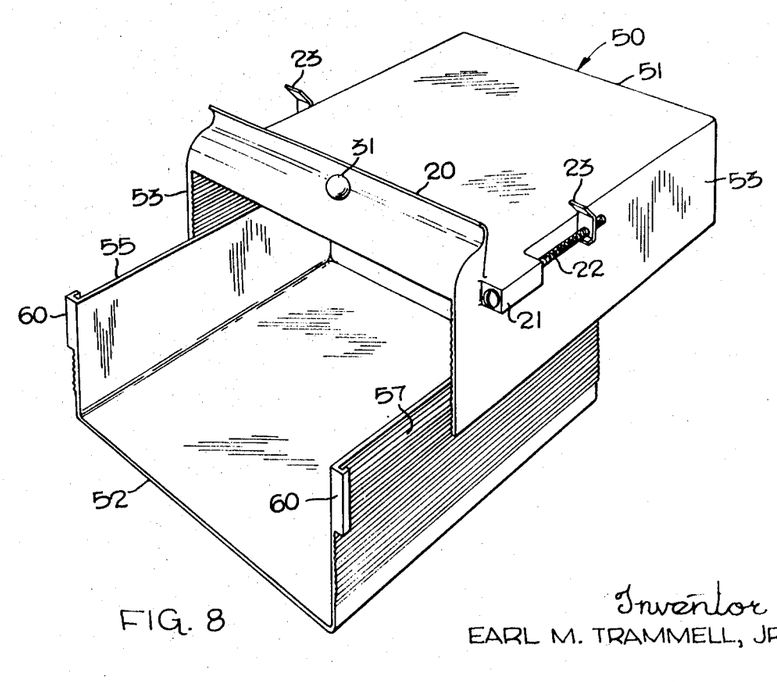
FIG. 8 is a perspective view of a casing in another embodiment of the container.

A resilient bumper 74 is carried by the rear wall 54 of upper casing part 51 and is located in the vertical, elongate slot 74 formed in the rear wall 56 of the lower casing part 52, the bumper 74 being movable along the slot 75 to permit telescopic adjustment of the casing parts 51 and 52. A similar rubber bumper (not shown) is carried in hole 76 formed in the rear wall 71 of lower drawer part 63 and extends through the aligned, vertical and elongate slot 77 formed in the rear wall 66 of upper drawer part 62. The resilient bumpers prevent rattle of the drawer 61 in the casing 50.

This container utilizes the limit plunger 31 of the same type previously disclosed in the embodiments of FIGS. 1-2, the plunger 31 engaging the stop 33 formed on the drawer part 62 to preclude unintentional complete withdrawal of the drawer 61 from the casing 50.

Another container embodiment is disclosed in FIGS. 12-16. In this embodiment, the container is substantially L-shape and includes telescopically related upper and lower parts 80 and 81. The container includes a front portion 82 that extends forwardly of and is positioned adjacent to the front side 11 of seat 10. Provided in the front container portion 82 is a top opening through which items can be inserted into the container. The container includes a flange 83 at each side which holds a magnet 84.

The mounting means is of the same general type disclosed in the embodiment of FIGS. 1-2, and includes a socketed boss 21 carried by the container. This boss 21 includes an upstanding ear 85 that is attracted to and held by the magnet 84. An adhesive pad 86 is secured to the ear 85 and is adhesively fixed to the front side 11 of seat 10. The threaded fastener 22 is carried by the boss 21 and is threadedly attached to a hook 23 that selectively engages the seat shoulder 13 and fits over the ledge 14. Again, it will be understood that the mounting means can consist of the various springs disclosed in the embodiments of FIGS. 4-5 and FIGS. 6-7.

The locking means interconnecting the upper and lower container parts 80 and 81, and holding the container parts in adjusted telescopic relation include a plurality of threaded sockets 87 formed on the lower container part 81. A plurality of threaded screws 90 are threadedly received in the socket 87 and support the upper container part 80. This threaded connection locates the adjusted telescopic position of the container parts 80 and 81 so as to fit under the automobile seat.

To install this container, the mounting means is first attached to the seat 10 in the manner previously described. Then, the container can be selectively attached to the mounting means by fitting the container under the seat 10 and by snapping the magnets 84 against the upstanding ears 85.

Figure 17:
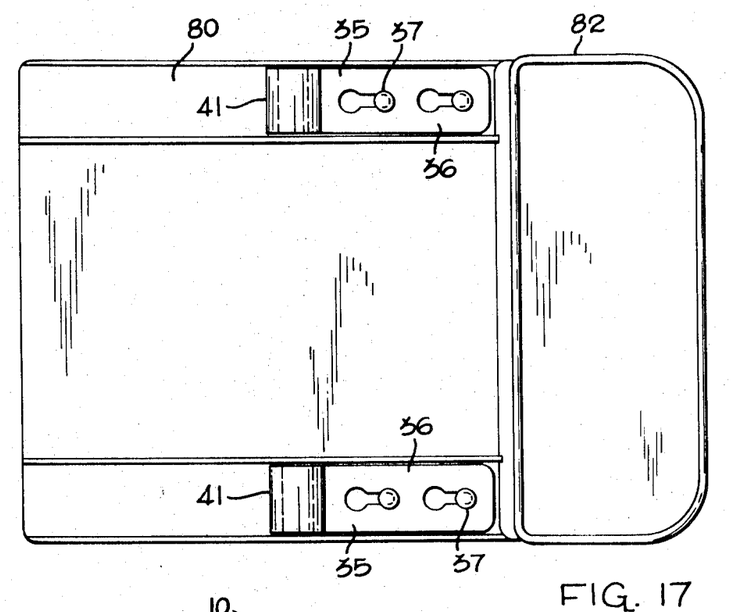
FIG. 17 is a top plan view of another embodiment.
Figure 18:
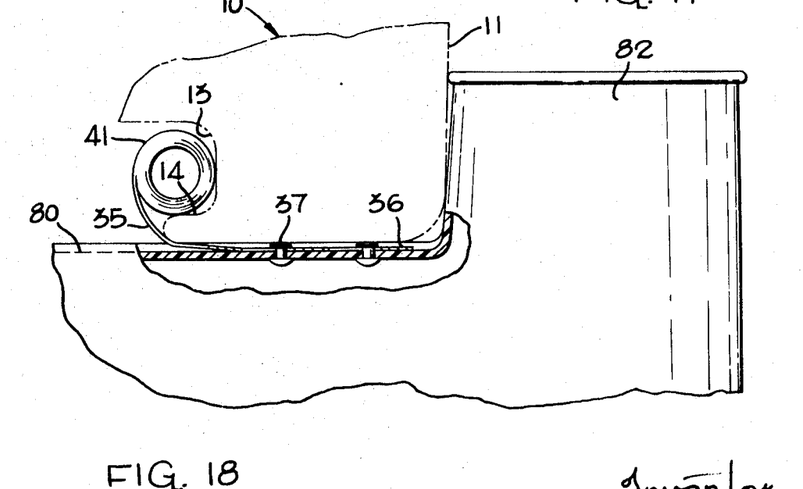
FIG. 18 is a side elevational view, partly in cross section, of the container of FIG. 17.

The mounting means of FIGS. 4 and 5 can be used to connect the container of FIGS. 12-16, as mentioned previously. For example, in FIGS. 17 and 18, the L-shaped container is positioned with its front portion 82 located forwardly of and adjacent to the front side 11 of seat 10. The mounting means, a flat coil spring 35 having its free outer end 36 secured by rivets 37 to the top wall 40 of the upper container part 80. Preferably, one coil spring 35 is provided at each side of the container. The opposite coiled end 41 os spring 35 hooks over the ledge 14 and engages the seat shoulder 13. The loading of spring 35 securely clamps the seat 10 between the coiled end 41 and the front portion 82.

I claim as my invention:

1. In an automobile seat assembly:
   a. an automobile seat having a front side and a bottom side, the bottom side being provided with a rearwardly facing shoulder,
   b. a litter and storage container fitting at least partially under the seat, the container being substantially L-shaped having a hollow front container portion extending forwardly of and adjacent to the front seat side and above the bottom seat side, and having a hollow near container portion that is angularly related to and in communication with the front container portion to provide a substantially L-shaped chamber, the front container portion having a top opening for insertion of material into both the front and bottom container portions, and
   c. mounting means connecting the container to the seat, the mounting means including an adjustable clamp means connected to the container and engaging the seat shoulder to hold the front container portion against the front seat side and to hold the bottom container portion under the bottom seat side.

2. In an automobile seat assembly:
   a. an automobile seat having a front side and a bottom side, the bottom side being provided with a rearwardly facing shoulder adjacent the lower edge of the front side,
   b. a litter and storage container fitting at least partially under the seat, the container being substantially L-shaped having a portion extending forwardly of and adjacent to the front seat side and having a top opening in the front container portion,
   c. mounting means connecting the container to the seat, the mounting means including an adjustable clamp means connected to the container and engaging the seat shoulder to hold the front container portion tightly against the front seat side, and
   d. the clamp means including:
      1. a socket carried by the container,
      2. a threaded fastener extending through the socket, and
      3. a hook threadedly attached to the fastener and engaging the seat shoulder to clamp the seat between the hook and the front container portion.

3. In an automobile seat assembly:
   a. an automobile seat having a front side and a bottom side, the bottom side being provided with a rearwardly facing shoulder adjacent the lower edge of the front side,
   b. a litter and storage container fitting at least partially under the seat, the container being substantially L-shaped having a portion extending forwardly of and adjacent to the front seat side and having a top opening in the front container portion,
   c. mounting means connecting the container to the seat, the mounting means including an adjustable clamp means connected to the container and engaging the seat shoulder to hold the front container portion tightly against the front seat side, and
   d. the clamp means including a flat coil spring having one end attached to the container and the opposite end attached to the seat shoulder, the spring loading of the coil spring clamping the seat between a spring end and the front container portion.

4. In an automobile seat assembly:
   a. an automobile seat having a front side and a bottom side,
   b. a litter and storage container including a hollow front container portion and a hollow rear container portion which are angularly related and in communication to provide a substantially L-shaped chamber, the front container portion being provided with an access opening for the substantially L-shaped chamber for insertion of material into both the front and bottom container portions, and
   c. mounting means connecting the substantially L-shaped container to the seat, the front container portion being located forwardly of and adjacent to the front seat side and above the rear seat side, and the bottom container portion being located under and adjacent to the bottom seat side.

5. An automobile seat assembly as defined in claim 4, in which:
   d. the front container portion having the access opening for the substantially L-shaped chamber is fixed relative to the front seat side so that the access opening is maintained at a constant height relative to the seat when the seat is moved back and forth despite irregularities in the floor contour or any change in seat height.

6. An automobile seat assembly as defined in claim 5, in which:
   e. the substantially L-shaped container includes telescopically related first and second sections, the second section being carried by the seat, and
   f. the second container section includes the upper part of the rear container portion and the upper part of the front container portion having the access opening.

7. An automobile seat assembly as defined in claim 6, in which:
   g. means associated with the telescopically related first and second sections to adjust the telescopic relation of said sections to the space under the seat as the seat is raised or lowered, the access opening of the front container portion being maintained at the constant height relative to the seat when the seat is raised or lowered as well as when the seat is moved back and forth.

* * * * *